United States Patent
Philippe et al.

(10) Patent No.: US 8,039,053 B2
(45) Date of Patent: Oct. 18, 2011

(54) METHOD FOR MAKING A PART OF COMPOSITE MATERIAL WITH CERAMIC MATRIX AND RESULTING PART

(75) Inventors: Eric Philippe, Merignac (FR); Sébastien Bertrand, Moulis-En-Medoc (FR); Eric Bouillon, Talence (FR); Alain Caillaud, Saint Caprais de Bordeaux (FR); Jean-Christophe Ichard, Merignac (FR); Robert Bagat, Valeyrac (FR)

(73) Assignee: SNECMA Propulsion Solide, Le Haillan (FR)

( * ) Notice: Subject to any disclaimer, the term of this patent is extended or adjusted under 35 U.S.C. 154(b) by 324 days.

(21) Appl. No.: 11/884,899

(22) PCT Filed: Feb. 22, 2006

(86) PCT No.: PCT/FR2006/050157
§ 371 (c)(1),
(2), (4) Date: Mar. 27, 2008

(87) PCT Pub. No.: WO2006/090087
PCT Pub. Date: Aug. 31, 2006

(65) Prior Publication Data
US 2008/0299385 A1    Dec. 4, 2008

(30) Foreign Application Priority Data
Feb. 23, 2005 (FR) .................... 05 01826

(51) Int. Cl.
*C23C 16/00* (2006.01)
(52) U.S. Cl. ........... 427/249.2; 427/249.1; 427/248.1
(58) Field of Classification Search .......... 427/249.2, 427/249.1, 248.1
See application file for complete search history.

(56) References Cited

U.S. PATENT DOCUMENTS

| 4,752,503 A | 6/1988 | Thebault |
| 5,246,736 A | 9/1993 | Goujard |

(Continued)

FOREIGN PATENT DOCUMENTS

EP  0 579 224   6/1993

(Continued)

OTHER PUBLICATIONS

Ortona et al., SiC-SiCf CMC manufacturing by hybrid CVI-PIP techniques: process optimisation, Fusion Engineering and Design, 51-52 (2000) pp. 159-163.*

(Continued)

*Primary Examiner* — Kelly Gambetta
(74) *Attorney, Agent, or Firm* — Weingarten, Schurgin, Gagnebin & Lebovici LLP

(57) ABSTRACT

An interphase coating is formed by chemical vapor infiltration (CVI) on the fibers constituting a fiber preform, the interphase coating comprising at least an inner layer in contact with the fibers for embrittlement relief to the composite material, and an outer layer for bonding with the ceramic matrix. The fiber preform is then kept in its shape by the fibers provided with the interphase coating and is consolidated by being impregnated with a liquid composition containing a ceramic precursor, and by transforming the precursor into a ceramic matrix consolidation phase. The consolidated preform is then densified by an additional ceramic matrix phase. No support tooling is needed for forming the interphase coating by CVI or for densification after consolidation using the liquid technique.

7 Claims, 1 Drawing Sheet

U.S. PATENT DOCUMENTS

| | | | |
|---|---|---|---|
| 5,738,908 A | 4/1998 | Rey et al. | |
| 5,738,951 A | 4/1998 | Goujard et al. | |
| 5,965,266 A | 10/1999 | Goujard et al. | |
| 6,068,930 A | 5/2000 | Lamouroux et al. | |
| 6,284,358 B1 * | 9/2001 | Parlier et al. | 428/294.4 |
| 6,291,058 B1 | 9/2001 | Goujard et al. | |
| 2003/0162647 A1 * | 8/2003 | Muhlratzer | 501/95.2 |

FOREIGN PATENT DOCUMENTS

| | | |
|---|---|---|
| EP | 1 277 716 | 1/2003 |
| FR | 2 401 888 | 9/1977 |

OTHER PUBLICATIONS

Ortona, A., et al: "SiC-SiC$_f$ CMC manufacturing by hybrid CVI-PIP techniques: process optimization" Fusion Engineering and Design, Elsevier Science Publishers, Amsterdam, NL, vol. 51-52, Nov. 2000, pp. 159-163.

Naslain, R., et al: "Boron-bearing species in ceramic matrix composites for long-term aerospace applications," Journal of Solid State Chemistry, Academic Press USA, vol. 177, No. 2, Feb. 2004, pp. 449-456.

* cited by examiner

continues

METHOD FOR MAKING A PART OF COMPOSITE MATERIAL WITH CERAMIC MATRIX AND RESULTING PART

This application is a §371 national phase filing of PCT/FR2006/050157 filed Feb. 22, 2006, and claims priority to French application No. 05 01826 filed Feb. 23, 2005.

BACKGROUND OF THE INVENTION

The invention relates to fabricating parts out of ceramic matrix composite material (CMC material).

CMC materials are generally used for parts that need to present good mechanical behavior up to high temperatures, typically 1200° C. and even above, in an oxidizing environment.

Applications for CMC materials are to be found in the aviation and space fields, for example for structural parts that are exposed to a stream of hot gas in an aero-engine.

CMC materials are formed on a fiber reinforcing substrate that is densified with a ceramic matrix. The substrate may be made of carbon fibers or of ceramic fibers, such as refractory oxide or nitride or carbide fibers (typically silicon carbide SiC).

A method of making CMC material is described in document U.S. Pat. No. 4,752,503. In that known method, an interphase coating is formed on the fibers so as to optimize bonding between the fibers and the matrix, i.e. so as to have bonding that is strong enough to transfer to the fiber reinforcement the mechanical stresses to which the material is subjected, but bonding that is not too strong so as to avoid making the material fragile, strong bonding encouraging cracks to propagate from the ceramic matrix and through the fibers, thereby degrading the fiber reinforcement. The interphase is typically pyrolytic carbon (PyC) or boron nitride (BN). The interphase can thus be formed by a succession of individual layers of PyC (or BN) and of SiC, thus contributing to deflecting cracks, as described in an article by R. Naslain et al., published in the Journal of Solid State Chemistry, Academic Press USA, Vol. 117, No. 2 (2004-2), pp. 449-456.

A method commonly used for densifying the fiber reinforcement substrate of a CMC material is chemical vapor infiltration (CVI). A reaction gas is introduced into an oven in which the temperature and pressure conditions are suitable for encouraging the gas to diffuse into the pores of the fiber reinforcement and to from the matrix by depositing on the reinforcing fibers a material that is produced by decomposing one of the constituents of the reaction gas or by a reaction taking place between a plurality of constituents thereof.

Another known process for densifying a porous substrate by a ceramic matrix is densification by a liquid technique. The substrate is impregnated by a composition in the liquid state that contains a precursor for the ceramic material of the matrix, e.g. a precursor in the form of a resin. The precursor is transformed by heat treatment to produce the ceramic material of the matrix. Such a liquid process implemented on a fiber texture having fibers coated in a boron nitride interphase is described in a document EP 0 549 224.

The fiber reinforcement substrate is made in the form of a preform of shape that corresponds to the shape of the part that is to be made. The fiber preform is obtained from fiber texture(s) such as in particular unidirectional textures, yarns, tows, woven fabric, or two-dimensional textures, one dimensional or multi-directional sheets or felts by methods such as winding, two- or three-dimensional weaving, braiding, draping (superposing plies of two-dimensional textures on a former), superposing plies of two-dimensional texture and bonding them together by needling, stitching, etc.

In order to conserve the shape desired for the fiber preform during densification, in particular when the part to be made is complex in shape, it is necessary to have recourse to support tooling. Such tooling occupies a large amount of space and represents a large amount of thermal inertia in a CVI oven. Thus, the densification of a preform with a ceramic matrix as obtained by CVI is performed in two steps. A consolidation first step is performed during which a ceramic matrix consolidating phase is deposited so as to bond together the fibers of the preform sufficiently strongly to enable the preform to conserve its shape without the help of tooling. After consolidation, the preform is withdrawn from the tooling and densification is continued during a second step.

Nevertheless, the CVI process is slow and consolidating preforms by such a process occupies a considerable length of time, with support tooling present in the oven, thereby leading to the above-mentioned drawbacks (occupying space and constituting thermal inertia). Furthermore, after consolidation, the preforms need to be cooled down, extracted from the oven so as to withdraw the support tooling, and then reinserted into the oven, and raised again to the desired temperature in order to continue densification, thus implying a large amount of manipulation.

Proposals have been made in an article by A. Ortona et al., published in Fusion Engineering and Design, Elsevier Science Publishers, Amsterdam, Netherlands, Vol. 51-52 (2000), pp. 159-163, to make a composite material part of the SiC—SiC type (fiber reinforcement and matrix both made of SiC) by a method comprising:

using a CVI process to form a carbon interphase on the SiC fibers of a fiber preform held in tooling;

then using a CVI process to form a first consolidating matrix phase of SiC within the fiber preform while still supported in tooling; and using a liquid process (polymer infiltration and pyrolysis) to form an SiC matrix phase finishing off the densification of the preform.

Document US 2003/0162647 discloses a method comprising forming a fiber preform out of SiC fibers and performing heat treatment. After a carbon interphase has been formed by CVI, a first matrix phase is made out of SiC by CVI, followed by a second matrix phase made out of SiC by a liquid technique, with a final deposit of SiC by CVI so as to close the cracks in the second matrix phase and form an SiC coating.

A similar method with a carbon interphase being formed by CVI, an SiC first matrix phase by CVI, an SiC second matrix phase by a liquid technique, and an SiC deposit by CVI for sealing the composite material is described in EP 1 277 716.

The above-mentioned documents have recourse to a CVI process for forming an SiC first matrix phase after an interphase coating has been formed on the fibers, with the above-mentioned drawbacks of CVI processes.

OBJECT AND SUMMARY OF THE INVENTION

An object of the invention is to remedy those drawbacks and to propose for this purpose a method of fabricating a composite material part comprising fiber reinforcement densified by a ceramic matrix, the method comprising:

using chemical vapor infiltration to form an interphase coating on the fibers constituting the fiber reinforcement, the interphase coating comprising at least an inner layer in contact with the fibers for providing embrittlement relief to the composite material, and an outer layer for bonding with the ceramic matrix;

shaping a fiber preform to constitute the fiber reinforcement of the composite material part, and holding the fiber preform to keep its shape with the fibers that are provided with the interphase coating;

consolidating the preform while kept in its shape by partial densification using a consolidating phase of ceramic matrix bonding the fibers to one another to enable the consolidated preform to conserve its shape on its own without help from support tooling, consolidation being performed by impregnating the fiber preform with a liquid composition containing a precursor for the material of the ceramic matrix consolidating phase, and transforming the precursor into ceramic; and continuing densification of the consolidated preform by an additional ceramic matrix phase.

The invention is remarkable for the combination of consolidating the fiber preform by a liquid technique and forming the interphase with an inner layer that provides a bond that is not too strong with the fibers and an outer layer that provides a good bond with the matrix. The consolidation using a liquid technique makes use of conventional techniques of impregnation with a liquid composition that are easy and quick to implement.

Although consolidating a fiber preform by a liquid technique is itself known, when forming a consolidating phase out of carbon, the Applicant has found that that technique cannot be implemented in the same manner with a liquid composition that is a precursor for a ceramic. For a preform made of carbon fibers (or coated in carbon), there is no adhesion between the ceramic precursor and the fibers, and that leads to lack of fiber-matrix bonding to the detriment of the ability to withstand mechanical forces. In contrast, with a ceramic fiber preform, adhesion is very strong and leads to fiber-matrix bonding that is too strong, thus making the material fragile. This difficulty is overcome by forming a specific interphase.

Advantageously, the fiber preform is made by shaping a fiber texture and the interphase coating is formed on the fibers constituting the fiber texture, prior to making the preform, and possibly even before even making the fiber texture. Forming the interphase coating by a CVI process then does not require any support tooling to be used, with such tooling being required, where appropriate, only for consolidation while using a liquid technique.

The thickness of the interphase coating formed on the fibers is preferably less than 100 nanometers (nm). It is thus possible to conserve good deformability.

According to a feature of the method, the inner layer of the interphase coating is made of a material selected from pyrolytic carbon PyC, boron nitride BN, and boron-doped carbon BC. The use of BC is preferred since it is less sensitive to oxidation than PyC and it is easier to work than BN.

The outer layer of the interphase coating is preferably made of a ceramic material similar to that of the matrix consolidating phase.

The fiber preform can be impregnated with a liquid composition containing a resin that is a precursor for the ceramic material of the matrix consolidating phase.

In another of its aspects, the invention also provides a CMC material part of the kind that can be obtained by the above-defined method.

According to the invention, a CMC material part comprising fiber reinforcement densified by a ceramic matrix, with an interphase coating formed on the reinforcing fibers is characterized in that:

the interphase coating has a thickness of less than 100 nm and comprises at least an inner layer in contact with the fibers for relieving embrittlement in the composite material, and an outer layer for bonding with the ceramic matrix; and the ceramic matrix comprises, in contact with the interphase coating, an inner matrix phase in the form of the product of ceramizing a precursor for the ceramic material of inner matrix phase, and at least one outer matrix phase in the form of a deposit obtained by chemical vapor infiltration.

The fibers of the fiber reinforcement may be made of a material selected from carbon and ceramics.

BRIEF DESCRIPTION OF THE FIGURES

The invention can be better understood on reading the following description with reference to the accompanying drawing, in which.

DETAILED DESCRIPTION OF IMPLEMENTATIONS

Figure 1:
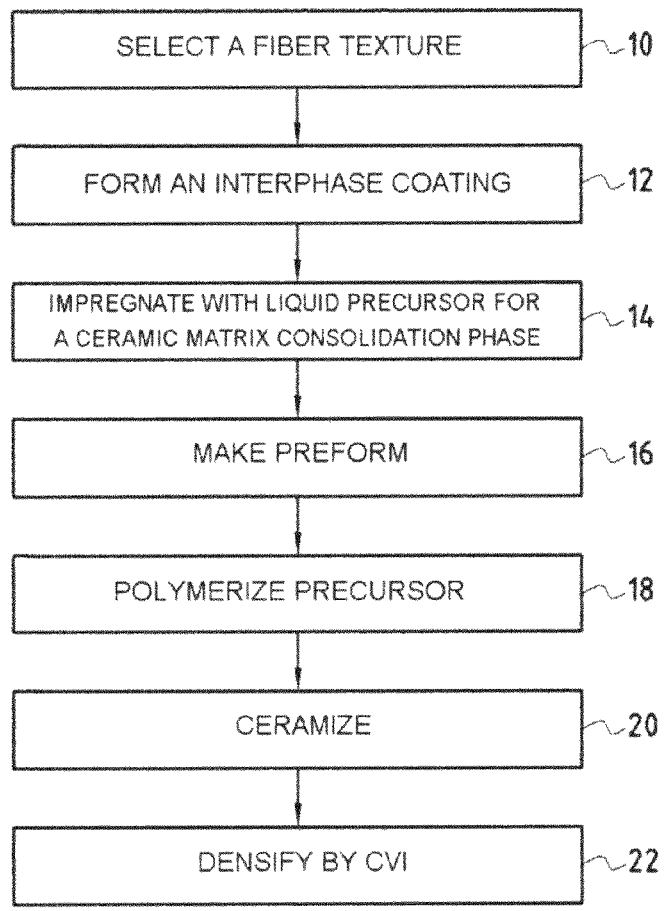
FIG. 1 shows the sequence of steps in making a CMC material part in an implementation of the invention.

A first step 10 of the method of FIG. 1 consists in selecting a fiber texture that, after subsequent shaping, is to constitute the fiber reinforcement for a CMC material part that is to be made.

The fibers of the texture may be carbon fibers or ceramic fibers. The method of the invention relates more particularly to using ceramic fibers, in particular fibers constituted essentially by silicon carbide SiC or some other refractory material such as an oxide, e.g. alumina or silica.

The fiber texture used may be in the form of a one-directional (1D) texture such as a yarn, tow, roving, or a two-dimensional (2D) texture such as a woven fabric, a one-directional or multi-directional sheet, knit, braid, or a three-dimensional (3D) texture such as a three-dimensional felt, woven fabric, knit, or braid, or a 3D texture formed by coiling or draping 1D or 2D textures. Under all circumstances, the fiber texture is a deformable texture.

In a second step 12, an interphase coating is formed on the fibers of the fiber texture by a chemical vapor infiltration process. The resulting interphase coating comprises:

an inner layer formed on the surface of the fibers and made out of an embrittlement-relief material that causes the CMC material that is to be made to be less fragile, i.e. a material that enables a bond to be made between the matrix of the CMC material and the fibers that is not too strong so that a crack propagating in the matrix has its energy dissipated in the embrittlement-relief layer and does not propagate through the fibers; and an outer layer made on the inner layer out of a ceramic material that provides good cohesion with the outer phase of the ceramic matrix of the CMC material with which it is in contact.

The material of the inner layer is selected in particular from PyC, BN, and BC, and is preferably BC because of its good resistance to oxidation and the ease with which it can be worked. CVI processes for forming layers of PyC, BN, and BC are well known. Reference can be made for example to the following documents: U.S. Pat. Nos. 4,752,503 and 6,068,930.

The material of the outer layer is selected in such a manner as to be compatible (i.e. not to react chemically) with the inner phase of the ceramic matrix of the CMC material and to adhere well thereto. It is preferable to select a material of the same kind as the material used for the inner phase of the ceramic matrix. Thus, when the inner phase of the ceramic matrix is made of SiC, the outer layer of the interphase coating is likewise made of SiC. CVI processes for forming SiC layers are well known. Reference can be made to the following documents: FR 2 401 888 and U.S. Pat. No. 5,738,908.

The interphase coating is formed on the fiber texture while in the free state. The fiber texture is placed in a CVI oven without being held by tooling, and the inner and outer layers are made in succession by modifying the gas that is introduced into the oven and optionally by adapting infiltration parameters (such as temperature, pressure, and transit time of the gas through the oven).

The total thickness of the interphase coating should be limited so that the fiber texture provided with the coating is not consolidated and conserves sufficient deformability to enable it to be shaped to constitute a preform of a CMC material part that is to be made.

This thickness is preferably selected to be less than 100 nm. The thickness of the outer layer of the interphase coating may be very small, even being limited to a few nm or a few tens of nm.

In a variant, the interphase coating may be formed on the fibers or fibrous elements constituting the fiber texture even before the texture is formed. For example, with a woven fiber texture, the interphase coating may be formed on the yarns constituting the fiber texture prior to weaving. The thickness of the interphase coating under such circumstances must also be limited, preferably less than 100 nm.

After the interphase coating has been formed, the fiber texture is impregnated by a liquid precursor for a consolidating inner phase of the ceramic matrix of the CMC material to be made (step 14). If the matrix phase is SiC, then the liquid precursor may be a resin, e.g. selected from polycarbosilanes, polycarbosilazanes, or polyhydrogenovinylsilanes. Liquid precursors of other ceramics are known, for example polyborazines that are precursors of BN or polysiloxanes that are precursors of Si—O—C.

Impregnation can be performed by passing through a bath of liquid precursor, possibly together with a solvent. The quantity of liquid precursor impregnating the fiber texture is selected to be sufficient to leave a consolidating matrix phase, i.e. a matrix phase that bonds the fibers of the fiber texture together sufficiently strongly to stiffen the texture. Typically, the consolidating matrix phase occupies about 5% to 8% by volume of the accessible pores of the fiber texture provided with the interphase coating.

After impregnation, the fiber texture is shaped so as to obtain a preform or blank having shape that corresponds to the shape of the CMC material part that is to be made (step 16). This shaping may be performed by winding or draping on a mandrel or on a former and by keeping the preform in the desired shape, should that be necessary, by means of support tooling.

In a variant, the shaping step may be performed with the fiber texture provided with the interphase coating, but not impregnated with the liquid precursor for the consolidating matrix phase. The resulting preform is kept in shape in tooling that constitutes a mold into which the desired quantity of liquid precursor is injected, using a process similar to that of injecting resin in a process of the well-known resin transfer molding (RTM) type.

The liquid precursor in resin form is polymerized, the fiber texture being kept in shape, if necessary, in its tooling (step 18). Polymerization is performed at a temperature that depends on the resin used, but low enough for it to be possible to use tooling made of metal.

The transformation of the polymerized precursor into ceramic (known as ceramization) is performed in conventional manner by subjecting the impregnated preform to heat treatment without tooling (step 20). The heat treatment is typically performed at a temperature in the range 800° C. to 1500° C. with an SiC precursor, depending in the nature of the fibers used.

Densification of the consolidated preform is then continued by CVI (step 22). The matrix formed by CVI may be of the same kind as the consolidating phase or it may be of a different kind. In particular, it is possible to make the final phase of densification by using an Si—B—C type of matrix or a self-healing matrix comprising alternating phases of Si—B—C and $B_4C$, as described in the following documents: U.S. Pat. Nos. 5,246,736, 5,965,266, and 6,291,058.

This produces a CMC material part with embrittlement relief that can be fabricated without requiring an interphase coating or a consolidating phase coating to be deposited by a CVI process while the texture being kept in shape by tooling.

EXAMPLE 1

Figure 2:
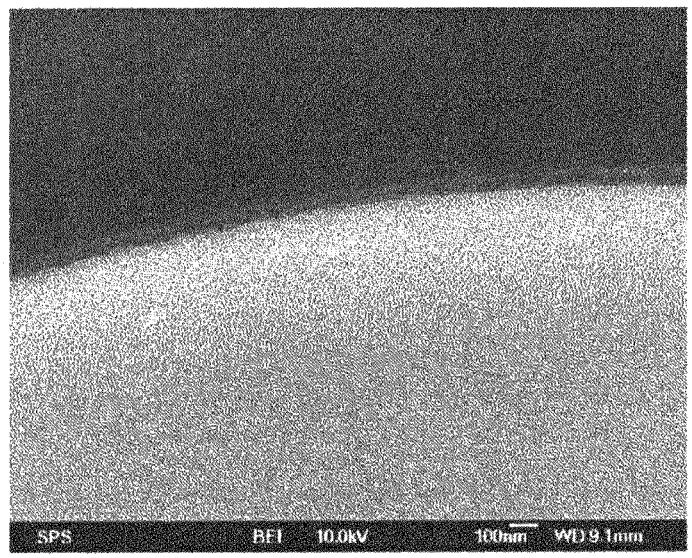
FIG. 2 is a microphotograph of an SiC fiber provided with an interphase coating.

A fiber texture was used constituted by a multilayer woven fabric (30) of fiber yarns made essentially of SiC as supplied under the reference "Hi-Nicalon" by the Japanese supplier Nippon Carbon, the fibers being united by a polyvinyl alcohol (PVA) reaming filament. A BC/SiC interphase coating (inner layer of BC and outer layer of SiC) was formed on the fibers by a CVI process. The thickness of the interphase coating was about 50 nm, the BC and SiC layers being of substantially the same thickness. The microphotograph of FIG. 2 shows the interphase coating formed on an SiC fiber.

The fiber texture provided with the interphase coating was impregnated by being passed through a bath containing a polycarbosilazane resin, a precursor of SiC, in solution in xylene, and then drying, so as to leave on the fibers a quantity of resin constituting about 40% by weight relative to the weight of the texture provided with the interphase coating.

A ply of impregnated fiber texture was kept in the shape of a plate in metal tooling during polymerization of the precursor which was performed at about 200° C.

The transformation of the polymerized precursor into SiC was performed without using tooling by means of heat treatment at a temperature of about 1000° C. The resulting SiC had achieved good consolidation of the preform, and represented about 12% by volume relative to the apparent volume of the consolidated preform.

The consolidated preform was subsequently densified with an Si—B—C type matrix using a CVI process.

A test piece of the resulting CMC material was subjected to a traction/traction fatigue test at 500° C. under a stress of 80 megapascals (MPa)±20 MPa at a frequency of 20 hertz (Hz). The test piece broke after 240 hours (h), demonstrating the good thermomechanical strength of the CMC material.

The invention claimed is:

1. A method of fabricating a composite material part comprising fiber reinforcement densified by a ceramic matrix, the method comprising:

using chemical vapor infiltration to form an interphase coating on the fibers to be used for constituting the fiber reinforcement without the fibers being held in shape by a tooling, the interphase coating comprising at least an inner layer in contact with the fibers for providing embrittlement relief to the composite material, and an outer layer for bonding with the ceramic matrix and the interphase coating having a thickness of less than 100 nanometers;

after forming the interphase coating, shaping a fiber preform to constitute the fiber reinforcement of the composite material part, the fiber preform being formed of said fibers provided with the interphase coating, and holding the fiber preform by means of a tooling to keep its shape;

consolidating the preform while kept in its shape by means of said tooling by partial densification using a consolidating phase of ceramic matrix bonding the fibers to one another to obtain a consolidated preform able to conserve its shape on its own without help from tooling, consolidation being performed by impregnating the fiber preform with a liquid composition containing a precursor for the material of the ceramic matrix consolidating phase, and transforming the precursor into ceramic; and continuing densification of the consolidated preform by an additional ceramic matrix phase.

2. A method according to claim 1, in which the fiber preform is made by shaping a fiber texture, the method being characterized in that the interphase coating is formed on the fibers of the fiber texture before making the preform.

3. A method according to claim 2, in which the interphase coating is formed on the fibers constituting the fiber texture before the texture is formed.

4. A method according to claim 1, wherein the inner layer of the interphase coating is made of a material selected from pyrolytic carbon, boron nitride BN, and boron-doped carbon BC.

5. A method according to claim 1, wherein the outer layer of the interphase coating is made of a ceramic material similar to that of the matrix consolidating phase.

6. A method according to claim 1, in which consolidating the preform includes impregnation by a liquid composition containing a resin that is a precursor of the ceramic material of the matrix consolidating phase.

7. A method according to claim 1, in which the densification of the preform consolidated by an additional ceramic matrix phase is performed by chemical vapor infiltration.

* * * * *